United States Patent
Koide et al.

(10) Patent No.: US 6,849,818 B2
(45) Date of Patent: Feb. 1, 2005

(54) ONE-WAY ROTARY SWITCH

(75) Inventors: Takashi Koide, Aichi (JP); Isao Maeda, Aichi (JP)

(73) Assignee: Kabushiki Kaisha Tokai Rika Denki Seisakusho, Aichi (JP)

(*) Notice: Subject to any disclaimer, the term of this patent is extended or adjusted under 35 U.S.C. 154(b) by 30 days.

(21) Appl. No.: 10/444,598

(22) Filed: May 27, 2003

(65) Prior Publication Data

US 2003/0230475 A1 Dec. 18, 2003

(30) Foreign Application Priority Data

Jun. 14, 2002 (JP) ........................................ 2002-174759

(51) Int. Cl.$^7$ ............................................... H01H 19/14
(52) U.S. Cl. ....................................... 200/564; 200/565
(58) Field of Search .......................... 200/4, 11 R, 11 J, 200/565, 567, 336, 533, 534, 564, 61.54, 61.55, 50.34, 61.27, 61.33, 61.36

(56) References Cited

U.S. PATENT DOCUMENTS

| | | | |
|---|---|---|---|
| 4,293,751 A | 10/1981 | Van Benthuysen et al. | 200/156 |
| 4,771,141 A * | 9/1988 | Flumignan et al. | 200/528 |
| 4,891,476 A * | 1/1990 | Nation et al. | 200/11 R |
| 5,049,709 A * | 9/1991 | Prickett et al. | 200/527 |
| 5,145,059 A * | 9/1992 | Park | 200/527 |
| 5,178,265 A * | 1/1993 | Sepke | 200/528 |
| 5,939,686 A | 8/1999 | Bellach et al. | 200/61.54 |
| 6,060,671 A | 5/2000 | Mozer et al. | 200/43.16 |
| 6,396,015 B1 * | 5/2002 | Ko | 200/529 |

FOREIGN PATENT DOCUMENTS

| DE | 198 42 805 A1 | 4/1999 |
|---|---|---|
| WO | WO 90/04738 | 5/1990 |

* cited by examiner

Primary Examiner—Michael Friedhofer
Assistant Examiner—Lisa Klaus
(74) Attorney, Agent, or Firm—Morgan, Lewis & Bockius LLP

(57) ABSTRACT

First stopper face (7b) is provided on each of click teeth (7) of a click teeth portion 8 of a click mechanism (14) affording a click feeling during the rotation-operation of a rotary knob (11). Second stopper face (13b) is provided on a tooth portion (13) of a click piece (10). The first stopper face (7b) and the second stopper face (13b) cooperate to prevent the rotary knob (11) from rotating in a direction opposite to a direction indicated by an arrow A. Consequently, there is no need for providing a stopper as an additional component.

6 Claims, 2 Drawing Sheets

ONE-WAY ROTARY SWITCH

BACKGROUND OF THE INVENTION

The present invention relates to a one-way rotary switch configured in such a way as to allow a rotary knob to perform a rotation-operation in only one direction.

Some levers respectively provided on steering column parts of vehicles, such as an automobile, are each provided with a rotary switch. Hitherto, generally, such a kind of a rotary switch has been enabled to perform rotation-operations of a rotary knob around an axis both in one direction and in the opposite direction, and configured in such a way as to change over switch elements with progress of the rotation-operation of the rotary knob. In this case, a click mechanism is provided therein so as to afford a click feeling. Generally, this click mechanism comprises a click teeth portion, which has a plurality of click teeth, and a click piece provided in a rotary knob in such a way as to be pushed against the click teeth portion and as to slide on the click teeth portion as the rotary knob rotates.

Meanwhile, there is a demand for a rotary switch that is provided in such a kind of a lever and configured in such a manner as to allow a rotary knob to rotate in only one direction and as to inhibit the rotary knob from rotating in the opposite direction. To meet this demand, a stopper for preventing the rotary knob from performing a rotation-operation in the opposite direction is needed. However, in the case that the stopper is provided as an additional component, the rotary knob has a drawback in that the number of components thereof increases.

SUMMARY OF THE INVENTION

The invention is accomplished in view of the aforementioned circumstances. Accordingly, an object of the invention is to provide a one-way rotary switch adapted to allow a rotary knob to perform a rotation-operation in only one direction.

In order to solve the aforesaid object, the invention is characterized by having the following arrangement.

First aspect A one-way rotary switch comprising:
  a switch body;
  a rotary knob rotatable around an axis with respect to the switch body;
  a switch element changed over based on a rotation of the rotary knob; and
  a click mechanism provided between the switch body and the rotary knob for allowing the rotary knob to rotate in a first direction and inhibiting the rotary knob from rotating in a second direction opposite to the first direction, the click mechanism affording a click feeling during the rotation of the rotary knob, the click mechanism including,
    a click teeth portion provided at the switch body and including a plurality of click teeth, wherein each of the click teeth includes an upward slope extending along the first direction and a first stopper face provided at an end portion of the upward slope so as to extend in a direction substantially perpendicular to the axis;
    a click piece provided at the rotary knob, movable in the axis with respect to the rotary knob and rotatably together with the rotary knob with respect to the switch body, wherein the click piece includes a sliding face which slides along the upward slope of the click teeth as the rotary knob rotates in the first direction, and a second stopper face for preventing the rotary knob from rotating in the second direction in cooperation with the first stopper face; and
    an urging member provided between the click piece and the rotary knob for urging the click piece toward the click teeth portion.

Second Aspect The one-way rotary switch according to the first aspect, wherein the urging member is a compression coil spring.

Third Aspect The one-way rotary switch according to the first aspect, wherein the switch body includes a cylindrical portion to which the rotary knob rotatably attached.

Fourth Aspect The one-way rotary switch according to the third aspect, wherein the click piece is an annular shape having a hole through which the cylindrical portion passes.

Fifth aspect The one-way rotary switch according to the first aspect, wherein the click piece includes a plurality of the second stopper faces, number of which corresponds to a number of the first-stopper faces.

Sixth Aspect The one-way rotary switch according to the first aspect, wherein a plurality of the click pieces are provided at the rotary knob.

DETAILED DESCRIPTION OF PREFERRED EMBODIMENTS

Figure 1:
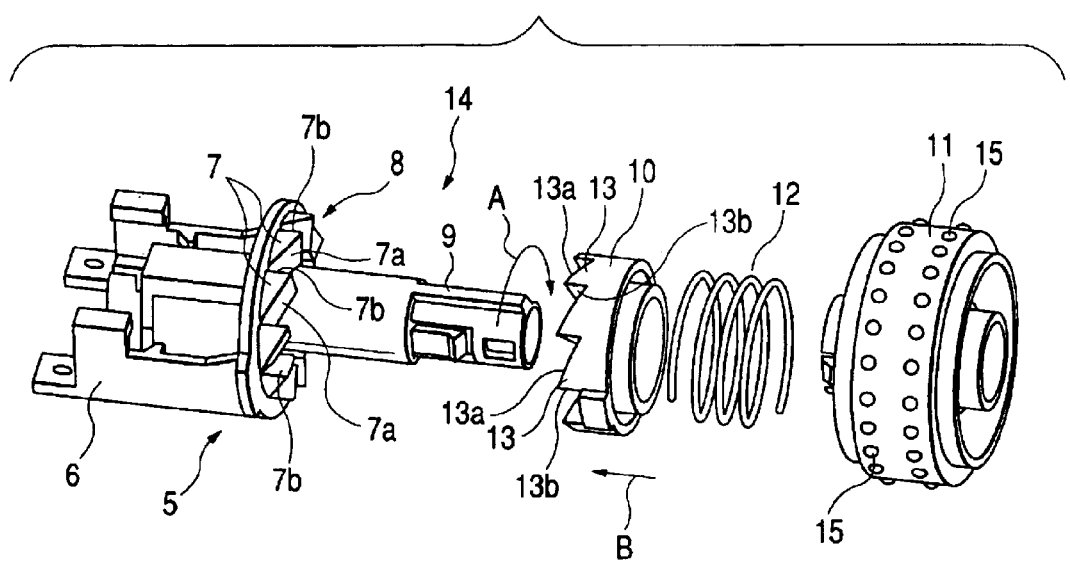
FIG. 1 is an exploded perspective view illustrating a primary part of a first embodiment of the invention.
Figure 2:
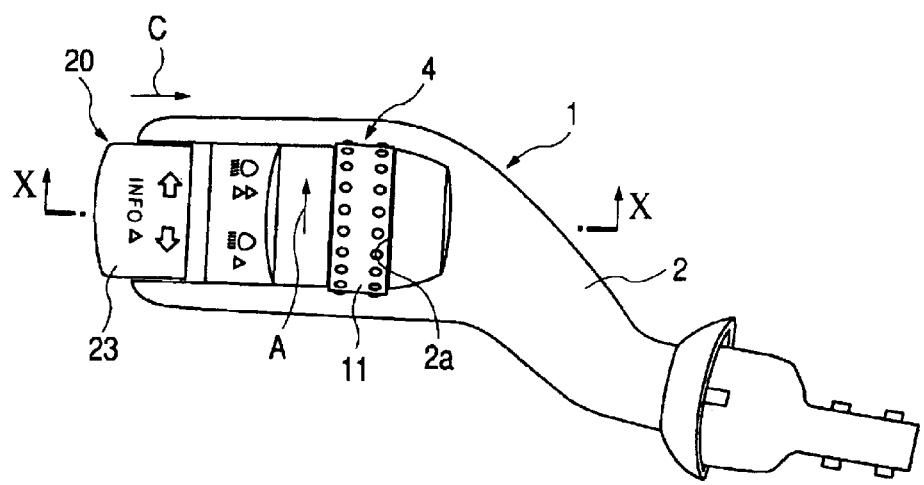
FIG. 2 is a front view illustrating the entirety of a lever.
Figure 3:
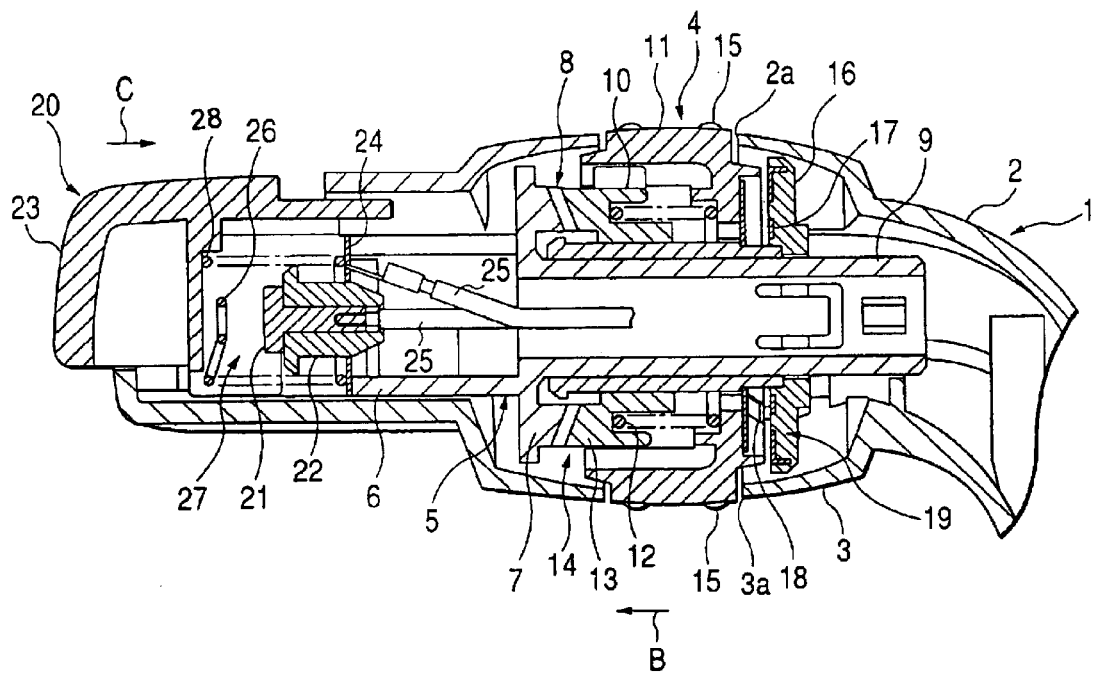
FIG. 3 is a sectional view taken along line X—X of FIG. 2.

Hereinafter, a first embodiment of the invention is described with reference to FIGS. 1 to 3. Referring first to FIGS. 2 and 3, there is shown a lever 1, which is provided on a steering column portion (not shown) of an automobile. The lever 1 is constructed as a hollow component by combining a lever upper part 2 and a lever lower part 3. One-way rotary switch 4 according to the invention is incorporated into an axial-end-side part (at the left side, as viewed in FIG. 2) of this lever 1. In this case, this one-way rotary switch 4 is used as an information display selection switch.

Holder 5 serving as a base of the one-way rotary switch is fixedly mounted in the lever 1. As shown in FIG. 1, this holder 5 integrally has a mounting portion 6, which is fixed to the lever 1 and provided at the left side as viewed in this figure, a click teeth portion 8 having a plurality of click teeth 7 provided at an axially middle portion, and an axially extending cylindrical portion 9 provided at the right side. The respective click teeth 7 of the click teeth portion 8 project to the right, as viewed in FIGS. 1 and 3, and arranged around the cylindrical portion 9 like a ring.

Each of the click teeth has a upward slope 7a along a direction indicated by an arrow A, which is a direction of rotation toward one direction around an axis, and also has a first stopper face 7b provided at an end portion at the side of the arrow A of this slope 7a in such a way as to be nearly perpendicular to the direction of the arrow A (that is, the direction of rotation).

Around the cylindrical portion 9 of the holder 5, a click piece 10 and a rotary knob 11, each of which is formed like a ring, are rotatably fitted. The click piece 10 is enabled to rotate in the direction of rotation together with the rotary knob 11, and to singly move in an axial direction. Between the click piece 10 and the rotary knob 11, a spring member 12 constituted by a compression coil spring, which composes an urging member, is disposed. The click piece 10 is pushed against the click teeth portion 8 by a pushing force of this spring member 12.

The click piece 10 has teeth portions, the number of which corresponds to that of the click teeth 7, on the surface (that is, the left side surface) thereof at the side of the click teeth portion 8. Further, each of the click portions 13 has a sliding face 13a constituted by a slope facing the slope 7a of the clip tooth 7, and also has a second stopper face 13b provided at an end portion of this sliding face 13a in such a way as to be nearly perpendicular to the direction of rotation (that is, the direction of the arrow A) of the rotary knob 11.

Incidentally, a click mechanism 14 comprises the click teeth portion 8 of the holder 5, the click piece 10, and the spring member 12 for urging this click piece 10 to the click teeth portion 8.

The rotary knob 11 is configured in such a way as to partly be exposed from opening portions 2a and 3a respectively formed in the lever upper part 2 and the lever lower part 3. In an outer surface of the rotary knob 11, a large number of convex portions 15 are provided in such a manner as to project therethrough. Thus, rotation-operations thereof are easy to perform.

Around the cylindrical portion 9, a ring-like insulator 16 is fixedly fitted by being placed at the right side of the rotary knob 11 and in the lever 1. This insulator 16 restrains the rotary knob 11 from moving to the right. Although not shown in detail, plural stationary contacts 17 are provided like a ring on the left side face (that is, the face at the side of the rotary knob 11). On the right side of the rotary knob 11, a movable contact 18 integrally rotating with the rotary knob 11 is provided. This movable contact 18 is press-contacted with the left side surface of the insulator 16 by its own elastic force.

Incidentally, a switch element 19 of the one-way rotary switch 4 comprises this movable contact 18 and the stationary contact 17. Further, although not shown, a lead wire is connected to the stationary contact 17. This lead wire is led to the steering column through the inside of the lever 1.

Meanwhile, a pushbutton switch 20 is provided at the left-side end portion of the lever 1. This pushbutton switch 20 is used as an information reset/set switch. Stationary contact 21 of this pushbutton switch 20 is fixedly provided at the mounting portion 6 of the holder 5 through a bush 22. Pushbutton 23 is provided at the left-side end portion of the lever 1 in such way as to be able to move in an axial direction. Further, the pushbutton 23 is prevented from falling off axially outwardly.

Spring member 25 constituted by a compression coil spring made of an electrically conductive material is disposed between a terminal 24 and the pushbutton 23, which are fixedly provide around the bush 22. The pushbutton 23 is pushed axially and outwardly (that is, to the left, as viewed in FIGS. 2 and 3) by a pushing force of this spring member 25. The spring member 25 is integrally provided with a movable contact portion 26. This movable contact portion 26 faces the stationary contact 21 from an axial direction. The movable contact portion 26 is electrically connected to the terminal 24 through the spring member 25. The lead wires 28 are connected to the terminal 24 and the stationary contact 21, respectively. These lead wires 28 are led to the steering column of the vehicle through the cylindrical portion 9 of the holder 5 and the lever 1. Opposed contact switch elements 27 are constituted by the stationary contact 21 and the movable contact portion 26.

Next, an operation of this embodiment of the aforementioned configuration is described hereinbelow.

First, when the rotary knob 11 is not operated in the one-way rotary switch 4, each of the sliding faces 13a of the click piece 10 abuts against the slope 7a of the associated click tooth 7. Moreover, each of the second stopper faces 13b abuts against the first stopper face 7b of the associated click tooth 7.

When a rotation-operation of the rotary knob 11 in the direction of the arrow A is performed during this state, the click piece 10 rotates in the direction of the arrow A together with the click piece 10 while each of the sliding faces 13a of the click piece 10 slides on the slope 7a of an associated one of the click teeth 7. Further, when each of the sliding faces 13a goes over the slope 7a of the associated click tooth 7, the click piece 10 moves along the stopper face 7b of the click tooth 7 in the direction of an arrow B shown in FIGS. 1 and 3. Then, each of the sliding faces 13a of the click piece 10 abuts against the slope 7a of the next associated click tooth 7. Moreover, each of the second stopper faces 13b abuts against the first stopper face 7b of the next associated click tooth 7a. As this rotary knob 11 rotates, the movable contact 18 comes apart from or in contact with the stationary contact 17 during the movable contact 18 slides on the left side surface of the insulator 16. Thus, the switch elements 19 are changed over. Moreover, the click mechanism 14 affords a click feeling.

When the rotation-operation of the rotary knob 11 in the direction of the arrow A is further performed, the switch elements 19 are sequentially changed over by repeatedly performing operations similar to the aforementioned one.

Incidentally, even when a rotation-operation of the rotary knob 11 in the direction opposite to that of the arrow A is tried, each of the second stopper faces 13b of the click piece 10 abuts against the first stopper face 7b of the associated click tooth 7. Therefore, the rotation-operation of the click piece 10, thus, that of the rotary knob 11 in the direction opposite to that of the arrow A cannot be performed. Hence, the first stopper faces 7b and the second stopper faces 13b cooperate to prevent the rotation-operation of the rotary knob 11 in the direction opposite to that of the arrow A from being performed.

Meanwhile, when the pushbutton 23 is not push-operated, the movable contact portion 26 is separated from the stationary contact 21 in the pushbutton 20, so that the switch element 27 is in an off-state. When the movable contact portion 26 is brought into contact with the stationary contact 21 by push-operating the pushbutton 23 in the direction of the arrow C against the pushing force of the spring member 25, the switch element 27 is turned on. Control unit (not shown) judges according to a received signal that this signal is, for example, a set signal. Further, when the push-operation of the pushbutton is canceled, the pushbutton 23 is returned by the pushing force of the spring button to an initial position, so that the switch element 27 is put into an off-state again.

Further, when a push-operation of the pushbutton 23 is performed again and the movable contact portion 26 comes into contact with the stationary contact 21, the switch element 27 is turned on. This time, the control unit (not shown) judges according to a received signal that this signal is a reset signal. Thus, at each of push-operations of the pushbutton 23, the set signal and the reset signal are alternately outputted therefrom.

The first embodiment can obtain the following advantages. That is, the one-way rotary switch 4 is configured so that the first stopper faces 7b of each of the click teeth 7 of the click teeth portion 8 and the second stopper faces 13b of the click piece 10 cooperate to prevent the rotary knob 11 from rotating in a direction opposite to the one direction. Thus, there is no necessity for providing a stopper therein. This enables reduction in the number of components, as compared with the case of needing the stopper as an additional component.

Figure 4:
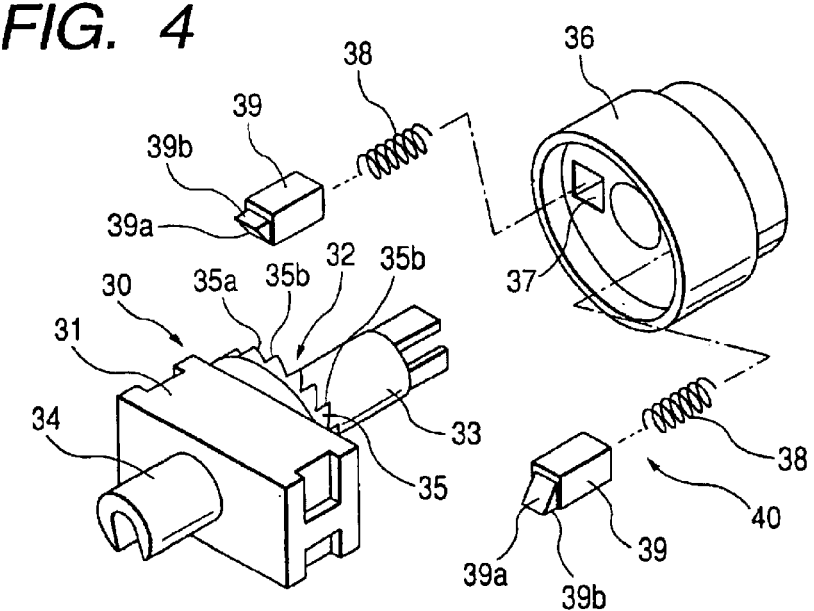
FIG. 4 is an exploded perspective view illustrating a primary part of a second embodiment of the invention.

FIG. 4 illustrates a second embodiment of the invention. This second embodiment differs from the first embodiment in the following respects.

Holder 30 of a one-way rotary switch has a mounting portion 31 whose section is rectangular, a click portion 32 provided at the right side portion of this mounting portion 31, a cylindrical portion 33 protruding therefrom to the right, and a stationary contact mounting portion 34 projecting to the left and having a C-shaped section. The holder 30 is fixedly mounted in the lever. Although not shown in detail, the click teeth portion 32 is provided with plural click teeth 35, which are similar to the click teeth 7 and arranged like a ring. Each of the click teeth 35 has a slope 35a and a first stopper face 35b.

Around the cylindrical portion 33, a ring-like rotary knob 36 is rotatably fitted. In the left-side surface of this rotary knob 36, concave portions 37 are formed at two places. In each of the concave portions 37, a spring member 38 and a click piece 39 are accommodated. Each of the click pieces 39 has a sliding face 39a and a second stopper face 39b. In this case, a click mechanism 40 comprises a click teeth portion 32, a click peace 9, and a spring member 38. Incidentally, the constitution of a switch element 19 is similar to that of the switch element of the first embodiment.

Although the two click pieces 39 are separately provided in the second embodiment, this embodiment does not need a stopper as an additional component. Consequently, the second embodiment can obtain advantages similar to those of the first embodiment.

As is apparent from the foregoing description, according to the invention, the first stopper face of each of the click teeth prevents the rotary knob in cooperation with the second stopper face of the click piece from rotating in the direction opposite to the one direction. Thus, there is no need for providing a stopper as an additional component. Consequently, as compared with the case of needing a stopper as an additional component, the invention can reduce the number of components.

What is claimed is:

1. A one-way rotary switch comprising:

a switch body;

a rotary knob rotatable around an axis with respect to the switch body;

a switch element changed over based on a rotation of the rotary knob; and a click mechanism provided between the switch body and the rotary knob for allowing the rotary knob to rotate in a first direction and inhibiting the rotary knob from rotating in a second direction opposite to the first direction, the click mechanism affording a click feeling during the rotation of the rotary knob, the click mechanism including, a click teeth portion provided at the switch body and including a plurality of click teeth, wherein each of the click teeth includes an upward slope extending along the first direction and a first stopper face provided at an end portion of the upward slope so as to extend in a direction substantially perpendicular to the axis;

a click piece provided at the rotary knob, movable in the axis with respect to the rotary knob and rotatably together with the rotary knob with respect to the switch body, wherein the click piece includes a sliding face which slides along the upward slope of the click teeth as the rotary knob rotates in the first direction, and a second stopper face for preventing the rotary knob from rotating in the second direction in cooperation with the first stopper face; and an urging member provided between the click piece and the rotary knob for urging the click piece toward the click teeth portion.

2. The one-way rotary switch according to claim 1, wherein the urging member is a compression coil spring.

3. The one-way rotary switch according to claim 1, wherein the switch body includes a cylindrical portion to which the rotary knob rotatably attached.

4. The one-way rotary switch according to claim 3, wherein the click piece is an annular shape having a hole through which the cylindrical portion passes.

5. The one-way rotary switch according to claim 1, wherein the click piece includes a plurality of the second stopper faces, number of which corresponds to a number of the first stopper faces.

6. The one-way rotary switch according to claim 1, wherein a plurality of the click pieces are provided at the rotary knob.

* * * * *